United States Patent [19]

Inoue et al.

[11] Patent Number: 5,942,567
[45] Date of Patent: Aug. 24, 1999

[54] RESIN-MOLDED PRODUCT AND YELLOWING INHIBITOR

[75] Inventors: Kaoru Inoue, Toyota; Takeyoshi Nishio, Okazaki; Arimitsu Usuki, Nagoya; Hisato Takeuchi, Chita, all of Japan

[73] Assignees: Toyota Jidosha Kabushiki Kaisha, Toyota, Japan; Kabushiki Kaisha Toyota Chuo Kenkyusho, Aichi-gun, Japan

[21] Appl. No.: 08/671,194

[22] Filed: Jun. 27, 1996

[30] Foreign Application Priority Data

Jun. 28, 1995 [JP] Japan .................................. 7-162476

[51] Int. Cl.$^6$ ...................................... C08K 5/13
[52] U.S. Cl. ................... 524/323; 524/418; 524/419; 524/421
[58] Field of Search ................... 524/100, 323, 524/418, 419, 421

[56] References Cited

U.S. PATENT DOCUMENTS

| | | | |
|---|---|---|---|
| 4,446,264 | 5/1984 | Cottman | 524/283 |
| 4,735,980 | 4/1988 | Sturm et al. | 524/291 |
| 4,824,883 | 4/1989 | Walters et al. | 524/93 |
| 5,032,634 | 7/1991 | Walter | 524/291 |

FOREIGN PATENT DOCUMENTS

| | | |
|---|---|---|
| 530641 | 3/1993 | European Pat. Off. . |
| 1557032 | 2/1969 | France . |
| 4022920 | 6/1991 | Germany . |
| 4141858 | 6/1992 | Germany . |
| 661104 | 5/1970 | Japan . |
| 48031977 | 10/1973 | Japan . |
| 4-348059 | 12/1992 | Japan . |
| 6-172494 | 6/1994 | Japan . |
| 7-118566 | 5/1995 | Japan . |
| 7-118567 | 5/1995 | Japan . |
| 7-118568 | 5/1995 | Japan . |
| 7-118569 | 5/1995 | Japan . |
| 7-171931 | 7/1995 | Japan . |

OTHER PUBLICATIONS

Database WPI, Derwent Publications Ltd. re JP–A58132035, Aug. 1983.

Chem., Abstract AN105:79850, Iida et al., Japanese Journal, 1986.

Hawley's Chem. Dictionary, p. 601, 1993.

*Primary Examiner*—Randy Gulakowski
*Attorney, Agent, or Firm*—Pillsbury Madison & Sutro LLP

[57] ABSTRACT

A resin-molded product includes a phenol-based oxidation inhibitor, and a thiol-based compound. The thiol-based compound reacts chemically with a coloring substance (or a compound having a quinone-type structure) resulting from the phenol-based oxidation inhibitor to interrupt a long conjugated system arising in the coloring substance. As a result, the absorption due to the coloring substance is canceled in the visible light region. Thus, the resin-molded product is inhibited from yellowing.

13 Claims, 1 Drawing Sheet

RESIN-MOLDED PRODUCT AND YELLOWING INHIBITOR

BACKGROUND OF THE INVENTION

1. Field of the Invention

The present invention relates to a resin-molded product which is inhibited from yellowing. The yellowing results from a phenol-based oxidation inhibitor. Moreover, the present invention also relates to a yellowing inhibitor agent which can appropriately inhibit the yellowing.

2. Description of the Related Art

Oxidation inhibitors are added to many resin-molded products, for instance, polyolefin-based resin-molded products such as automobile resin-molded bumpers to inhibit resin-molded products from thermally deteriorating during molding operations, or during services.

As for the oxidation inhibitors, it is possible to exemplify phenol-based oxidation inhibitors, phosphorus-based oxidation inhibitors, and sulfur-based oxidation inhibitors. Among the oxidation inhibitors, the phosphorus-based oxidation inhibitors are used for resin-molded products to which an elevated temperature of 200° C. or more is applied. The phenol-based oxidation inhibitors and sulfur-based oxidation inhibitors are used for resin-molded products to which a relatively low temperature of from 80 to 100° C. is applied. In particular, the phenol-based oxidation inhibitors are usually used for resin-molded products such as automobile resin-molded bumpers, because the sulfur-based oxidation inhibitors were found to induce coloring when they are used together with light-slabilizing agents, such as HALS (Hindered Amine Light Stabilizer).

Resin-molded products such as automobile resin-molded bumpers are usually painted with acrylic-melamine-based paints, or the like, in order to make final products. However, the phenol-based oxidation inhibitors have been known to cause yellowing in the acrylic-melamine-based paint films. Accordingly, instead of the phenol-based oxidation inhibitors, it is necessary to select an oxidation inhibitor, which is less likely to cause yellowing in the acrylic-melamine-based paint films, for automobile bumpers.

The phenol-based oxidation inhibitors are believed to cause yellowing in the acrylic-melamine-based paint films in the following manner: coloring substances (i.e., reactants resulting from the phenol-based oxidation inhibitors), or the phenol-based oxidation inhibitors themselves migrate from resin-molded products into the paint films, and eventually they are visible from the outside.

SUMMARY OF THE INVENTION

The present invention has been developed in view of the aforementioned circumstances. It is therefore an object of the present invention to reliably inhibit resin-molded products with a phenol-based oxidation inhibitor added from yellowing.

The first aspect of the present invention is a resin-molded product which is inhibited from yellowing. A resin-molded product according to the present invention comprises:

a resin substrate;

a phenol-based oxidation inhibitor in the resin substrate; and a thiol-based compound in the resin substrate.

The second aspect of the present invention is a yellowing inhibitor for inhibiting yellowing, caused by coloring substances resulting from a phenol-based oxidation inhibitor. The yellowing inhibitor according to the present invention is included in the present resin-molded product, and comprises:

a thiol-based compound.

In the second aspect of the present invention, it is especially preferred that the present yellowing inhibitor including a thiol-based compound can inhibit the yellowing by chemically interrupting a conjugated system resulting from a phenol-based oxidation inhibitor.

Phenol-based oxidation inhibitors included in resin-molded products capture radicals which are produced in resin-molded products by heat generated during the molding operations of the resin-molding products and the baking-and-drying operations of paint films. The phenol-based oxidation inhibitors make the captured radicals harmless by structurally transforming, for instance, by dimerizing. Thus, the phenol-based oxidation inhibitors keep the resin-molded products from being oxidized and deteriorating.

The phenol-based oxidation inhibitors capture radicals, and transform their structure into a quinone-type structure by means of chemical reaction. For example, 3,5-di-t-butyl-4-hydroxytoluene (hereinafter simply referred to as "BHT"), one of hindered phenol-based oxidation inhibitors, react chemically with the radicals to make stilbenequinone (hereinafter simply referred to as "SBQ"), a dimer, as set forth in reaction formula (1) below:

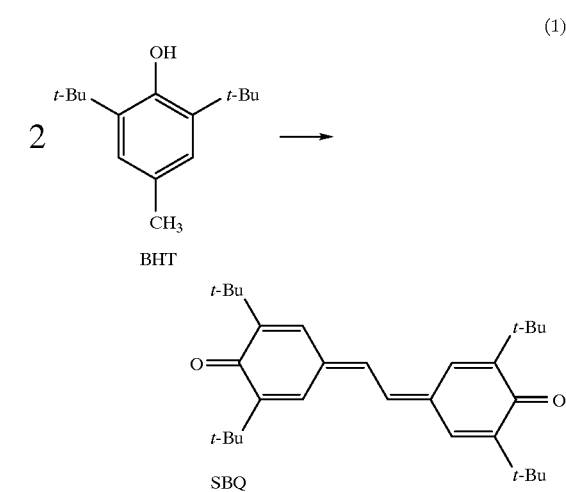

The conjugated system extends as the phenol-based oxidation inhibitors transform structurally, and accordingly the resulting compound having a quinone-type structure absorbs light in the visible light region. Thus, it has been known that the compound having a quinone-type structure is a coloring substance which causes the resin-molded products to yellow.

In view of the circumstances described above, the present resin-molded product comprises a yellowing inhibitor which includes a thiol-based compound in addition to a phenol-based oxidation inhibitor. The yellowing inhibitor reacts chemically with a coloring substance (or the compound having a quinone-type structure), such as the SBQ, as set forth in reaction formula (2) below, to interrupt the long conjugated system. Note that the yellowing inhibitor does not break any chemical bonds themselves. As a result, the absorption is canceled in the visible light region, and the coloring is decolorized.

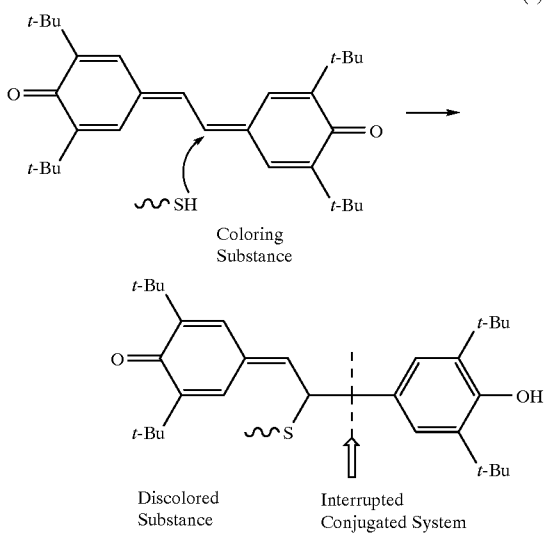

Coloring Substance

Discolored Substance   Interrupted Conjugated System (2)

The thiol-based compound does not react with the phenol-based oxidation inhibitors, but reacts only with the compound having a quinone-type structure which results from the reaction of the phenol-based oxidation inhibitors with the radicals. Thus, the thiol-based compound has a favorable selectivity; namely: it does not adversely affect the oxidation-inhibiting action of the phenol-based oxidation inhibitors, but reacts with the coloring substance only.

As having been described so far, the present resin-molded product is securely inhibited from yellowing due to heat and light. Further, after the present resin-molded product is completed, it is free from problems stemming from yellowing. Furthermore, it can show a stable color tone for a long period of time. Moreover, it can improve the qualities of paint films remarkably.

In addition, the present yellowing inhibitor can inhibit yellowing alone without adversely affecting the action of phenol-based oxidation inhibitors. Thus, it is highly useful to inhibit resin-molded products including phenol-based oxidation inhibitors from yellowing.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
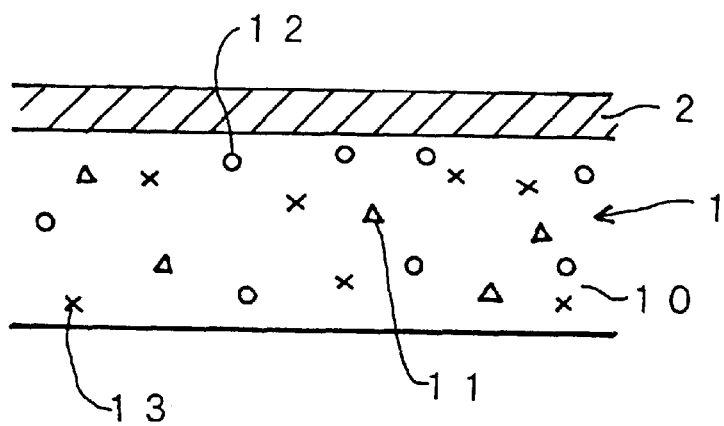
FIG. 1 is a schematic cross-sectional view of a preferred embodiment of a resin-molded product according to the present invention.

Having generally described the present invention, a further understanding can be obtained by reference to the specific preferred embodiments which are provided herein for the purpose of illustration only and not intended to limit the scope of the appended claims.

As for the phenol-based oxidation inhibitor included in the present resin-molded product, it is possible to exemplify the following ordinary phenol-based oxidation inhibitors in addition to the aforementioned BHT; namely: dibutylhydroxytoluene, alkylated phenol, 4,4'-thio-bis(6-t-butyl-3-methylphenol), 4,4'-butyridene-bis(6-t-butyl-3-methylphenol), 2,2'-methylene-bis(4-methyl-6-t-butylphenol), 2,2'-methylene-bis(4-ethyl-6-t-butylphenol), 2,6-di-t-butyl-4-ethylphenol, 1,1,3-tris(2-methyl-4-hydroxy-5-t-butylphenyl) butane, n-octadecyl-3-(4-hydroxy-3,5-di-t-butylphenyl) propionate, tetrakis [methylene-3-(3,5-di-t-butyl-4-hydroxyphenyl) propionate] methane, dilaurylthiodipropionate, distearylthiodipropionate, and dimyristylthiopropionate. In addition to the ordinary phenol-based oxidation inhibitors, it is possible to exemplify the following hindered phenol-based oxidation inhibitors; namely: triethylene glycol-bis[3-(3-t-butyl-5-methyl-4-hydroxyphenyl) propionate], 1,6-hexartediol-bis-3-(3,5-di-t-butyl-4-hydroxyphenyl) propionate, 2,4-bis(n-octylthio)-6-(4-hydroxy-3,5-di-t-butylanilino)-1,3,5-triazine, pentaerithrityl-tetrakis-3-(3,5-di-t-butyl-4-hydroxyphenyl) propionate (shown by chemical formula (3) below), 2,2-thio-diethylene-bis-3-(3,5-di-t-butyl-4-hydroxyphenyl) propionate, octadecyl-3-(3,5-di-t-butyl-4-hydroxyphenyl) propionate (shown by chemical formula (4) below), N, N'-hexamethylene-bis(3,5-di-t-butyl-4-hydroxy-hydrocinnamide), 3,5-di-t-butyl-4-hydroxy-benzylphosphonatediethylester, 1,3,5-trimethyl-2,4,6-tris(3, 5-di-t-butyl-4-hydroxybenzyl) benzene (shown by chemical formula (5) below), tris(3,5-di-t-butyl-4-hydroxybenzyl) isocyanurate (shown by chemical formula (6) below), and 2,4-bis[(octylthio)-methyl]o-cresol. Note that, in the present resin-molded, product, it is possible to use one of the aforementioned specific phenol-based oxidation inhibitors independently, or to use a plurality of them.

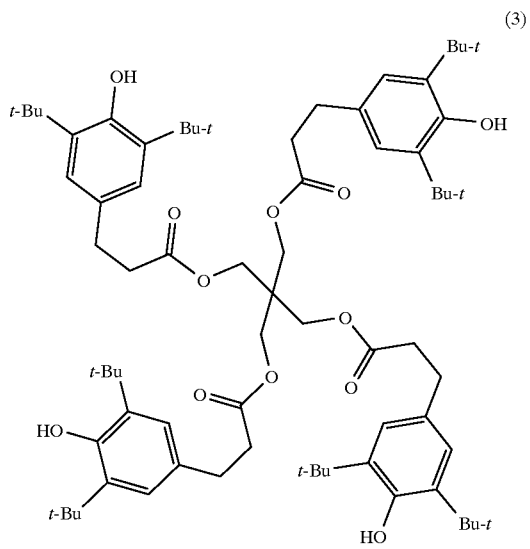

(3)

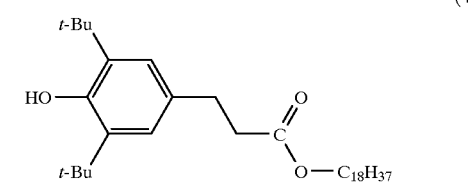

(4)

-continued

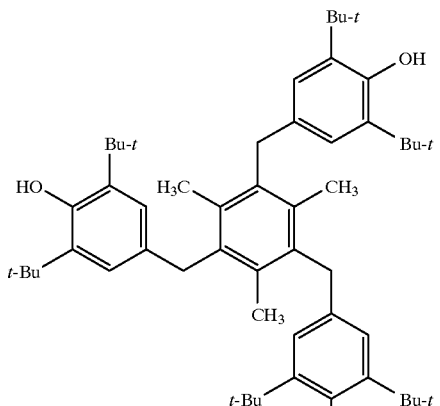

(5)

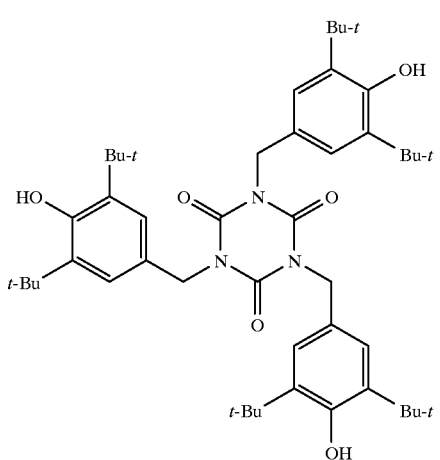

(6)

In the present resin-molded product, it is preferable to use the phenol-based oxidation inhibitor in a total amount of from 0.01 to 5 parts by weight, further preferably from 0.01 to 1 part by weight, furthermore preferably from 0.01 to 0.5 parts by weight, with respect to 100 parts by weight of a resin substrate. When the phenol-based oxidation inhibitor is used in an amount of less than 0.01 part by weight with respect to 100 parts by weight of a resin substrate, it is difficult to inhibit a resin substrate from oxidizing and deteriorating. When the phenol-based oxidation inhibitor is used in an amount of more than 1 part by weight with respect to 100 parts by weight of a resin substrate, the phenol-based oxidation inhibitor degrades the physical properties of the resulting resin-molded product, and it is less likely to dissolve into a resin substrate. Thus, it is not preferable to use the phenol-based oxidation inhibitors in such amounts.

The yellowing inhibitor included in the present resin-molded product is a thiol-based compound having an SH-group as an end group. Examples include: alkylmercaptan, alkylmercaptan having a functional group capable of silane coupling, a polymer having a thiol functional group, and tetra-alkylammoniumthiocyanate. The alkylmercaptan can be dithioglycol, and hexylmercaptan. The alkylmercaptan having a functional group capable of silane coupling can be 3-mercaptopropyltriethoxysilane.

Among the aforementioned yellowing inhibitors, the alkylmercaptan, such as 3-mercaptopropyltriethoxysilane, having a functional group capable of silane coupling reacts with inorganic additives, such as talc, which are usually included in resin-molded products, and it eventually reacts with the coloring substance on the inorganic additives. Thus, the alkylmercaptan can capture the discolored coloring substance on the inorganic additives and inhibit the discolored coloring substance from migrating to the surface of the resin-molded products, and from resulting in unexpected troubles.

In the present resin-molded product, it is preferable to add the yellowing inhibitor in an amount of 0.01% by weight or more, further preferably from 0.01 to 1.0% by weight, with respect to the whole present resin-molded product taken as 100% by weight. When the yellowing inhibitor is added in an amount of less than 0.01% by weight with respect to the whole resulting resin-molded product taken as 100% by weight, it is difficult to discolor the coloring substance. When the yellowing inhibitor is added in an amount of more than 1% by weight with respect to the whole resulting resin-molded product taken as 100% by weight, it is difficult to hold the physical properties of the resulting resin-molded product in a certain application.

Note that, in the present resin-molded product, the resin substrate can include any resin. More preferably, the resin substrate includes at least one member selected from the group consisting of polyethylene, polypropylene, elastomer-modified polypropylene, a polyvinyl chloride resin, an ABS resin, an AS resin, a polyamide resin, and a poylacetal resin.

The preferred embodiments will be hereinafter described with reference to an experimental example, and examples.

EXPERIMENTAL EXAMPLE

Dithioglycol, and hexylmercaptan were added to a dispersion including SBQ, respectively, in an amount of 2 times by mole with respect to SBQ. The mixtures were then heated to 150° C., and their colors were changed from yellow to transparency. The products resulting from the heating were analyzed, and found to have a structure in which the thiol compounds were added to SBQ.

Thus, it was evident that dithioglycol and hexylmercaptan respectively reacted with SBQ at 150° C. or more to interrupt the conjugated system in SBQ, and effected to cancel the absorption in the visible light region.

Example No. 1-1

FIG. 1 illustrates a schematic cross-sectional view of a preferred embodiment of the present resin-molded product. This resin-molded product 1 was, for instance, equivalent to an automobile bumper, and comprised a resin substrate 10, an additive 11, an oxidation inhibitor 12, and a yellowing inhibitor 13. The resin substrate 10 comprised polypropylene (hereinafter abbreviated to as "Ppp") The additive 11 to the resin substrate 10 were talc, EPR (i.e., ethylene propylene rubber), and carbon black. Further, the surface of the resin-molded product 1 was coated with a white paint film 2 in order to highlight the yellowing.

A process for producing the painted resin-molded product 1 will be hereinafter described. 38.995% by weight of the additive 11, and 1% by weight of the oxidation inhibitor 12 (e.g., BHT, one of the phenol-based oxidation inhibitors), and 0.005% by weight of the yellowing inhibitor 13 (e.g., dithioglycol) were mixed with a PP powder, and the resulting mixture was extruded and then pelletized. Pellets were thus prepared.

The pellets were molded to plate-shaped test specimen by injection molding. One of the opposite surfaces of the plate-shaped test specimens was painted with a chlorinated-polyolefine-based primer in a thickness of 5 $\mu$m. Further, the surface of the primer film was painted with an alkyd-melamine-based-resin intermediate-coating paint in a thickness of 30 $\mu$m. Furthermore, the surface of the intermediate-coating paint film was painted with a white acryl-melamine-based-resin top-coating paint in a thickness of 45 $\mu$m. Finally, the thus painted plate-shaped test specimens were baked at 120° C. for 20 minutes. A plurality of test specimens were thus produced.

The resulting test specimens were subjected to a heat resistance test in which they were heated at 80° C. for 480 hours. Before and after the heat resistance test, the test specimens were examined for their reflection spectra at a plurality of points on their paint film surfaces by using an "SM color computer, 5S-1S-2B" manufactured by SUGA TESTING MACHINE Co., Ltd. Based on the reflection spectra before and after the heat resistance test, the $\Delta$b value was calculated. The $\Delta$b value was the average difference between the "b" values (i.e., yellowing degree) at the measurement points before and after the heat resistance test. The same heat resistance test and reflection-spectra measurement were repeatedly carried out onto each of the test specimens. Table 1 below lists the results of the examination as the distribution of the $\Delta$b values. Note that the $\Delta$b values are set forth in JIS Japanese Industrial Standard) Z8730 (1980), and were defined by the International Commission on Illumination (CIE) in 1976.

Example No. 1-2

Except that the addition amount of the yellowing inhibitor 13 (e.g., dithioglycol) was changed to 0.010% by weight, and the addition amount of the additive 11 was changed to 38.990% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 1-3

Except that the addition amount of the yellowing inhibitor 13 (e.g., dithioglycol) was changed to 0.015% by weight, and the addition amount of the additive 11 was changed to 38.985% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 2-1

Except that the yellowing inhibitor 13 was switched from dithioglycol to hexylmercaptan and added in the identical amount, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 2-2

Except that the yellowing inhibitor 13 was switched from dithioglycol to hexylmercaptan, its addition amount was changed to 0.010% by weight, and the addition amount of the additive 11 was changed to 38.990% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 2-3

Except that the yellowing inhibitor 13 was switched from dithioglycol to hexylmercaptan, its addition amount was changed to 0.015% by weight, and the addition amount of the additive 11 was changed to 38.985% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 3-1

Except that the yellowing inhibitor 13 was switched from dithioglycol to 3-mercaptopropyltriethoxysilane and added in the identical amount, a plurality of test specimens were prepared and subjected to the examination in the same manner as Example No. 1-1. Based on the resulting reflection spectra before and after the heat resistance test, the distribution of the $\Delta$b values, was determined. Table 1 lists the results of the examination.

Example No. 3-2

Except that the yellowing inhibitor 13 was switched from dithioglycol to 3-mercaptopropyltriethoxysilane, its addition amount was changed to 0.010% by weight, and the addition amount of the additive 11 was changed to 38.990% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Example No. 3-3

Except that the yellowing inhibitor 13 was switched from dithioglycol to 3-mercaptopropyltriethoxysilane, its addition amount was changed to 0.015% by weight, and the addition amount of the additive 11 was changed to 38.985% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

Comparative Example

Except that no yellowing inhibitor 13, such as dithioglycol, etc., was used, and the addition amount of the additive 11 was changed to 39.000% by weight, a plurality of test specimens were prepared and subjected to the examination in the same manner as Example No. 1-1. Based on the resulting reflection spectra before and after the heat resistance test, the distribution of the $\Delta$b values was determined. Table 1 lists the results of the examination.

TABLE 1

| | Yellowing Inhibitor | | |
| --- | --- | --- | --- |
| | Specific Agent | Addition Amount (% by Weight) | Yellowing Degree (Δb Value) |
| Ex. No. 1-1 | Dithioglycol | 0.005 | $4 \geq \Delta b \geq 2$ |
| Ex. No. 1-2 | ditto | 0.010 | $2 \geq \Delta b$ |
| Ex. No. 1-3 | ditto | 0.015 | $2 \geq \Delta b$ |
| Ex. No. 2-1 | Hexylmercaptan | 0.005 | $5 \geq \Delta b \geq 3$ |
| Ex. No. 2-2 | ditto | 0.010 | $3 \geq \Delta b \geq 1$ |
| Ex. No. 2-3 | ditto | 0.015 | $2 \geq \Delta b$ |
| Ex. No. 3-1 | 3-Mercaptopropyltriethoxysilane | 0.005 | $5 \geq \Delta b \geq 3$ |
| Ex.No.3-2 | ditto | 0.010 | $3 \geq \Delta b \geq 1$ |
| Ex. No. 3-3 | ditto | 0.015 | $2 \geq \Delta b$ |
| Comn. Ex. | none | none | $\Delta b \geq 4$ |

As shown in Table 1, the examples according to the present invention exhibited Δb values of 3 or less when the addition amount of the yellowing inhibitor 13 was 0.01% by weight or more. Thus, compared with the comparative example, the present examples were far less likely to yellow. Moreover, even when the addition amount of the yellowing inhibitor was 0.005% by weight, some of the test specimens of the present examples exhibited Δb values smaller than that of the comparative example. Accordingly, it is believed that the values can be further reduced with respect to that of the comparative example by varying the other factors. At present, however, it is preferred that the addition amount of the yellowing inhibitor is 0.01% by weight or more, further preferably in a range of from 0.01 to 1% by weight, with respect to the whole resin-molded product taken as 100% by weight.

The test specimens of the comparative example are believed to yellow in the following manner: BHT produced compounds having a quinone structure survived in the test specimens, because they were not attacked by the yellowing inhibitor 13 and eventually migrated into the paint film to yellow the test specimens.

On the other hand, the test specimens of Example Nos. 1-1 to 1-3 are believed to exhibit low Δb values because the compounds having a quinone structure reacted with dithioglycol, as set forth in reaction formula (7) below; namely: the chemical reaction interrupted the conjugated system in the compounds, and canceled the absorption in the visible light region. As a result, the test specimens exhibited low Δb values.

(7)

Further, the test specimens of Example Nos. 2-1 to 2-3 are believed to exhibit low Δb values because the compounds having a quinone structure reacted with hexylmercaptan, as set forth in reaction formula (8) below; namely: the addition reaction of hexylmercaptan interrupted the conjugated system in the compounds, and canceled the absorption in the visible light region. As a result, the test specimens exhibited low Δb values.

(8)

Figure 2:
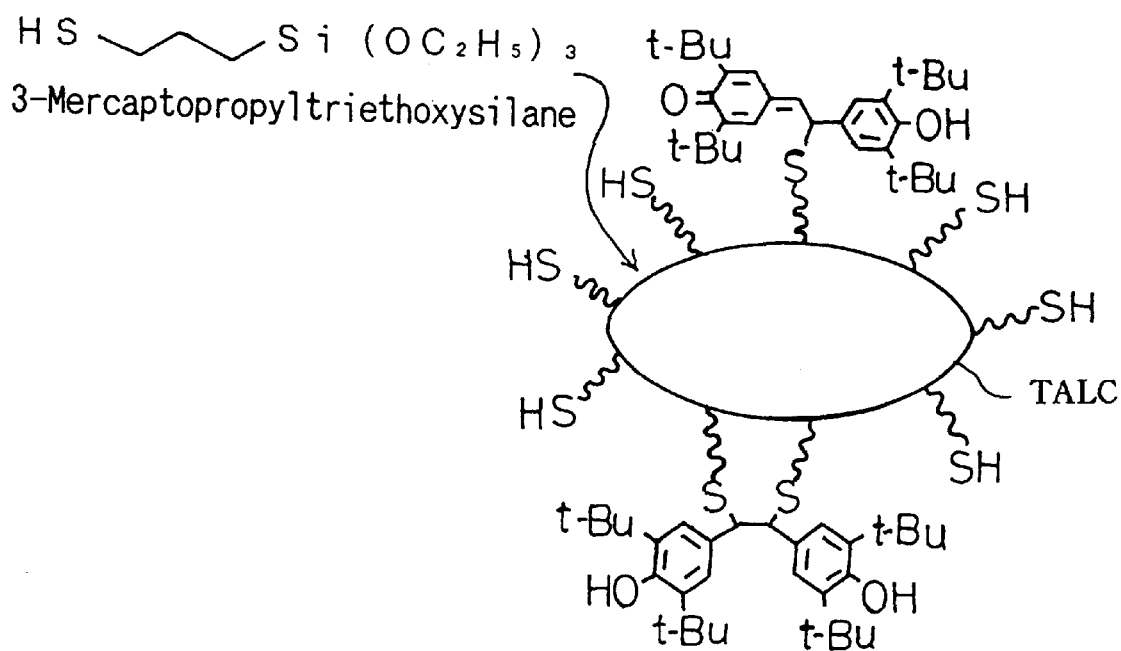
FIG. 2 is a schematic explanatory view for illustrating actions in another preferred embodiment of a resin-molded product according to the present invention in which 3-mercaptopropyltriethoxysilane reacts with a compound having a quinone structure on talc.

Furthermore, the test specimens of Example Nos. 3-1 to 3-3 are believed to exhibit low Δb values in the following manner; namely: 3-mercaptopropyltriethoxysilane reacted with the talc, one of the components of the additive 11, and further reacted with the compounds having a quinone structure on the talc as illustrated in FIG. 2. Thus, 3-mercaptopropyltriethoxysilane interrupted the conjugated system in the compounds, and canceled the absorption in the visible light region. As a result, the test specimens exhibited low Δb values. In the test specimens, the quinone-type compounds with the interrupted conjugated system were captured on the talc, and hardly migrated into the paint film to precipitate on the surface of the paint film. Hence, unexpected troubles resulting from the migration could be inhibited from happening.

The present invention has been described by reference to the specific examples, the resin-molded products covered with the paint film. It is needless to say that the yellowing inhibitor according to the present invention is applicable to resin-molded products free from the paint film, and that the present yellowing inhibitor operates likewise to produce the advantages described above.

Having now fully described the present invention, it will be apparent to one of ordinary skilled in the art that many changes and modifications can be made thereto without departing from the spirit or scope of the present invention as set forth herein including the appended claims.

What is claimed is:

1. A resin-molded article, comprising:
 a substrate in a solid state formed from at least one resin;
 at least one phenol-based antioxidant which captures radicals to form quinone-type structures dispersed in said substrate for inhibiting deterioration of said substrate; and at least one non-aromatic thiol-based yellowing inhibitor having reactive —SH groups dispersed in said substrate for inhibiting said substrate from yellowing caused by coloring substances generated from said phenol-based antioxidant.

2. The resin-molded article according to claim 1, wherein said thiol-based yellowing inhibitor is included in an amount of 0.01% by weight or more with respect to the whole resin-molded article taken as 100% by weight.

3. The resin-molded article according to claim 1, wherein said thiol-based compound is at least one member selected from the group consisting of alkylmercaptan, alkylmercaptan having a functional group capable of silane coupling, a polymer having a thiol functional group, and tetra-alkylammoniumthiocyanate.

4. The resin-molded article according to claim 3, wherein said alkylmercaptan is dithioglycol.

5. The resin-molded article according to claim 3, wherein said alkylmercaptan is hexylmercaptan.

6. The resin-molded article according to claim 3, wherein said alkylmercaptan having a functional group capable of silane coupling is 3-mercaptopropyltriethoxysilane.

7. The resin-molded article according to claim 1, wherein said phenol-based antioxidant is included in an amount of from 0.01 to 1 part by weight with respect to 100 parts by weight of said substrate.

8. The resin-molded article according to claim 1, wherein said phenol-based oxidation inhibitor is at least one member selected from the group consisting of 3,5-di-t-butyl-4-hydroxytoluene, dibutylhydroxytoluene, alkylated phenol, 4,4'-thio-bis(6-t-butyl-3-methylphenol), 4,4'-butyridene-bis(6-t-butyl-3-methylphenol), 2,2'-methylene-bis(4-methyl-6-t-butylphenol), 2,2'-methylene-bis(4-ethyl-6-t-butylphenol), 2,6-di-t-butyl-4-ethylphenol, 1,1,3-tris(2-methyl-4-hydroxy-5-t-butylphenyl) butane, n-octadecyl-3-(4-hydroxy-3,5-di-t-butylphenyl) propionate, tetrakis [methylene-3-(3,5-di-t-butyl-4-hydroxyphenyl) propionate] methane, dilaurylthiodipropionate, distearylthiodipropionate, dimyristylthiopropionate, triethylene glycol-bis[3-(3-t-butyl-5-methyl-4-hydroxyphenyl) propionate], 1,6-hexanediol-bis-3-(3,5-di-t-butyl-4-hydroxyphenyl) propionate, 2,4-bis(n-octylthio)-6-(4-hydroxy-3,5-di-t-butylanilino)-1,3,5-triazine, pentaerithrityl-tetrakis-3-(3,5-di-t-butyl-4-hydroxyphenyl) propionate, 2,2-thio-diethylene-bis-3-(3,5-di-t-butyl-4-hydroxyphenyl) propionate, octadecyl-3-(3,5-di-t-butyl-4-hydroxyphenyl) propionate, N,N'-hexamethylene-bis(3,5-di-t-butyl-4-hydroxy-hydrocinnamide), 3,5-di-t-butyl-4-hydroxy-benzylphosphonate-diethylester, 1,3,5-trimethyl-2,4,6-tris(3,5-di-t-butyl4-hydroxybenzyl) benzene, tris(3,5-di-t-butyl-4-hydroxybenzyl) isocyanurate, and 2,4-bis [(octylthio)-methyl]-o-cresol.

9. The resin-molded article according to claim 1, wherein said thiol-based yellowing inhibitor chemically interrupts a conjugated system resulting from a phenol-based antioxidant.

10. The resin-molded article according to claim 1, wherein said thiol-based compound is at least one member selected from the group consisting of alkylmercaptan, alkylmercaptan having a functional group capable of silane coupling, a polymer having a thiol functional group, and tetra-alkylammoniumthiocyanate.

11. The resin-molded article according to claim 10, wherein said alkylmercaptan is dithioglycol.

12. The resin-molded article according to claim 10, wherein said alkylmercaptan is hexylmercaptan.

13. The resin-molded article according to claim 10, wherein said alkylmercaptan having a functional group capable of silane coupling is 3-mercaptopropyltriethoxysilane.

* * * * *